Patented July 22, 1941

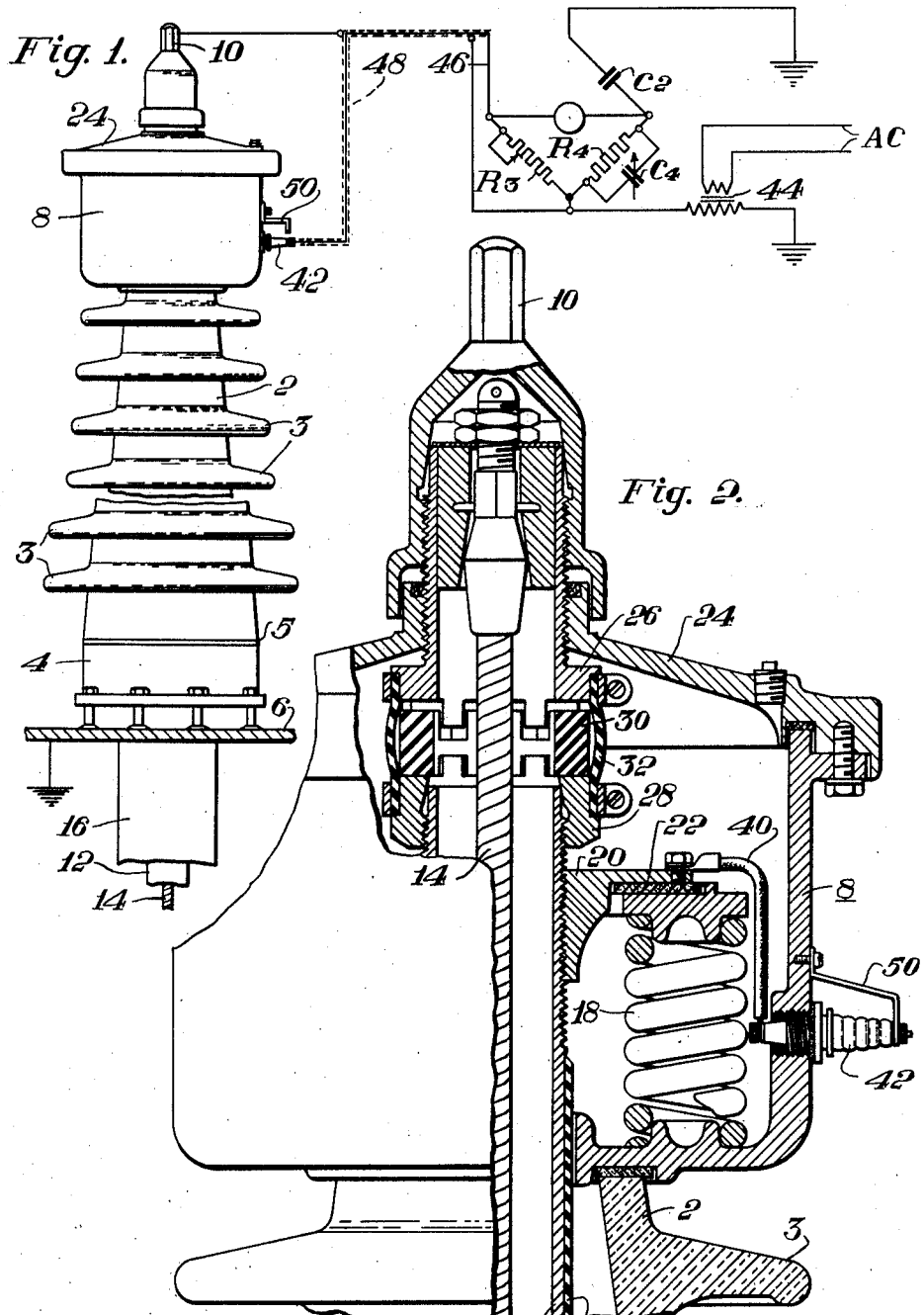

2,249,862

UNITED STATES PATENT OFFICE 2,249,862

HIGH TENSION BUSHING

Alexander A. Skvortzoff and Fred J. Vogel, Sharon, Pa., assignors to Westinghouse Electric & Manufacturing Company, East Pittsburgh, Pa., a corporation of Pennsylvania Application October 27, 1938, Serial No. 237,284

7 Claims. (Cl. 175—183)

The present invention relates to insulating bushings and more particularly to an improvement in bushings used to insulate the leads of high-tension electrical apparatus, such as transformers and circuit-breakers.

In bushings of the type contemplated, there is usually provided a porcelain shell or weathercasing through which a conducting lead extends to a suitable terminal on one end of the porcelain shell. The shell itself is mounted upon the grounded tank of the oil-immersed apparatus, and the conducting lead constitutes the connection between such apparatus and an outside circuit. The conducting lead is usually surrounded by suitable insulation, such as porcelain cylinders, or a wrapping of suitably impregnated or coated paper or fabric, or a condenser-type wrapping, and the shell is filled with an insulating oil, gum or similar fluid-like material.

In recent years it has become increasingly desirable to be able to test the power factor, or losses, of the insulation afforded by bushings of this general character. The test may be made upon initial assembly of the bushing, and periodically thereafter after the bushing has been placed in service. After the bushing has been placed in service, the testing is desirably undertaken while the bushing is in position in the field, and this has been variously accomplished as, for example, by the wattmeter method disclosed in Doble Patent No. 1,945,263, or by a bridge method as disclosed in Patent No. 2,130,865, issued September 20, 1938 to Watts et al.

A difficulty encountered, in field testing particularly, is that when the bushing is tested in the usual manner by connecting the test lead to the bushing terminal, the test potential is applied not only between the bushing insulation and ground, but also to the leads and windings of the transformer with which it is associated or the parts of the circuit-breaker with which it is connected. This means that the loss, as measured, will be the loss in the bushing itself as well as losses in the transformer winding and circuit-breaker parts. In the event of an undesirably high power factor reading, therefore, when obtained in the usual manner, it is necessary to disassemble the bushing lead from the electrical apparatus in the tank and test the various elements separately to determine which is the defective part, or where the undesirable loss is occurring. This of course required substantial time and expense involving in many cases a day or more for testing the bushings on one circuit-breaker or transformer. In view of the time and expense required, the testing is often neglected with the result that the apparatus may operate for some time in a dangerous condition before the danger is noticed or the apparatus fails.

In accordance with the present invention, a bushing for a transformer or circuit-breaker or the like is so constructed that the tests can be made in the usual way by attaching the test lead to the terminal of the bushing, and if the reading obtained is abnormal, by a simple manipulation the insulation of the bushing itself may be tested segregated from the parts of the apparatus in the casing with which the bushing is associated. This decreases the testing time to a matter of minutes instead of hours.

It is an object of the present invention to provide a bushing construction for insulating the leads of electrical apparatus which enables testing of the bushing insulation itself independent of any losses which may be attributable to defects in the apparatus with which the bushing is associated.

Other objects will be apparent from the following description when read in connection with the accompanying drawing, in which:

Figure 1 is a view in elevation, with parts broken away, of a bushing assembled in accordance with the present invention, accompanied by a schematic showing of a testing circuit; and Fig. 2 is a view in vertical section, with parts broken away, of a portion of the bushing shown in Fig. 1.

Referring more specifically to the drawing, the bushing of the present invention comprises a shell 2 of dielectric material, such as porcelain, with usual outstanding flanges 3 formed integral therewith. The shell is supported at its base upon a ground-flange 4 with a gasket 5 interposed therebetween. The ground-flange is suitably bolted to a casing 6 for electrical apparatus, such as a circuit-breaker or transformer immersed in oil therein. The top of the shell 2 is closed by a cap 8 having secured thereto a terminal 10 for connection to an outside circuit.

By way of example, and not limitation, the insulation within the bushing is of the condenser type which, as is well known, comprises alternate layers of insulating and conducting material wound upon a central stud 12. In the present instance the stud 12 is hollow and a conducting lead 14 from the apparatus in the tank extends through the stud and is secured within the cap 8 to the terminal 10. In Fig. 1, the condenser wrapping is indicated at 16, and it is not believed that a further disclosure thereof is required.

Referring to Fig. 2, it will be noted that the cap 8 comprises a cup-shaped body portion proportioned to seat upon the top of the porcelain shell 2 with a gasket between the confronting areas, and is resiliently maintained in that position by means of helical springs 18 bearing upon the base of the cup and being held under compression by a nut 20 threaded to the top portion of the stud 12. In all types of bushings where an element corresponding to stud 12 is used, the lower end of the stud is fixed with respect to the shell 2, so that provision must be made to take care of unequal thermal expansion between the stud and shell. This is accomplished in the present instance through the resiliency of the springs 18, a desired number of which is provided depending upon the size of the bushing. It should also be noted that an insulating washer 22 is interposed between the nut 20 and the top seat of the spring 18, and that the first layer of the wrapping of condenser winding 16 insulates the base of the cap 8 from the stud 12.

The cap 8 is provided with a cover 24 to which the terminal 10 is secured, and is provided with an internal tubular fitting 26 to which the upper terminal of the conductor 14 is suitably bolted. The lower end of the fitting 26 is provided with a series of notches, and the upper end of the stud 12 is provided with a correspondingly notched fitting 28. Between these notched portions an insulating block 30 of fibre, or a phenolic condensation product, or other suitable insulating material, having complementary notches is interposed. The lower end of fitting 26 and the upper end of fitting 28 are connected by means of a flexible tubular member 32 by clamps around the ends of the member and the respective fitting ends. The member 32 may be of any suitable flexible fluid-impervious material, it having been found that one such material is an artifical rubber sold commercially under the name "Duprene."

The purpose of the foregoing construction is to assemble the cover 24 with the fittings 26 and 28, insulating block 30, and flexible hose 32, before placing the cover in position. When such assembly is made, by reason of the interfitting notches, the fitting 28 may be screwed down upon the end of stud 12 by rotating the cover as it is being seated. With the cover secured in position, communication between the interior of the hollow stud 12 and the interior of the cap is prevented by reason of the flexible hose 32, and at the same time longitudinal expansion of the stud is permitted without injury to any of the bushing parts. Further, the springs 18 having been compressed to a point where they will always be in compression throughout the entire range of expansion and contraction of the stud 12 with temperatures usually encountered in service, there will always be a compressive force acting upon the gasket beneath the cap as well as the gasket 5 at the lower end of the porcelain shell, to insure fluid tight joints at these points.

With the construction thus far described, the stud 12 is entirely insulated from the cap 8 and the conducting lead 14, as well as the terminal 10. If it is desired to test the power factor of the bushing independent of the apparatus connected with lead 14, it would merely be necessary to connect the test lead, that is, apply the test potential, to the stud itself and read the power factor loss between the stud and the ground-flange 4, which is connected to the grounded tank 6 of the apparatus. This is accomplished in accordance with the present invention by providing a lead 40 connected to the nut 20, which is in contact with the stud 12. The lead 40 is secured to the inner end of a small bushing 42 of the spark-plug type which is secured in the wall of the cap 8 having an exposed terminal to which the test potential may be applied. There is sufficient space between an adjacent pair of the springs 18 to provide space for the bushing 42 and lead 40.

The test circuit is indicated in Fig. 1, in which the test equipment is of the bridge type, as generally disclosed in the aforesaid Patent No. 2,130,865, comprising a source of alternating current which is stepped up to the test potential by means of a transformer 44 and imposed between one point of the bridge circuit and ground. The bridge includes a variable resistor $R_3$, a variable condenser $C_4$, which is shunted by a fixed resistance $R_4$ in two adjacent arms. Other arms of the bridge include a standard condenser $C_2$, having one side ground, and a lead 46 which is extended to the terminal of the small bushing 42 on the bushing to be tested. An ammeter or galvanometer in the cross arm of the bridge is caused to give a null reading by manipulation of $R_3$ and $C_4$. The dial markings on $R_3$ and $C_4$ are then read to give values proportional to the capacity and power factor of the bushing being tested. Commonly a shielding circuit 48 surrounds the test lead and is maintained at the test potential, and in the present arrangement this shielding circuit is preferably also connected to the terminal 10 of the bushing, or any convenient part electrically connected to the conductor 14, to supply the losses in the lead 14 and apparatus connected to it so that the bridge readings will not be affected.

After the test has been completed, it is generally desirable that the stud 12 and lead 14 be maintained at the same potential. This may be accomplished by providing a clip 50 secured at one end to the cap body 8 and at the other end to the outer terminal of the small bushing 42. In the ordinary operation of the bushing, the clip 50 is in the position shown in Fig. 2 to insure that the stud 12 and lead 14 are at the same potential. When a test is to be made, the outer end of the clip 50 is removed from the bushing 42 and bent back to the position shown in Fig. 1.

By reason of the construction and arrangement described, an unusually efficient means is provided for testing the insulation value of bushings independently of the conductor extending therethrough and of the apparatus associated therewith. It is understood, of course, that if a test of the entire equipment is desired, the test lead 46 will be attached as usual to the bushing terminal 10. If the value obtained in this manner is abnormal, the bushing itself may be segregated from the rest of the apparatus, by opening the clip 50, and tested separately to determine whether the fault is in the apparatus or in the bushing insulation.

Quite obviously variations may be made in the construction shown without departing from the spirit of the invention, and it is desired that no limitations be placed on the invention except as imposed by the appended claims.

We claim as our invention:

1. In an insulating bushing, a shell of insulating material having a hollow conducting member extending therethrough, a cap having a terminal thereon, means cooperating with said hollow conducting member for clamping said cap in position to close an end of said shell including means for insulating said hollow conducting member from said cap, a conducting lead extending through said hollow conducting member for connection to said terminal and means for insulating said lead from said member, a second terminal mounted on said cap and insulated therefrom for connection to a test circuit, an electrical connection from said second terminal to said hollow conducting member within said cap, and releasable means for electrically connecting said second terminal and said conducting lead to maintain said lead and hollow conducting member at substantially the same electrical potential during normal operation of the bushing.

2. In an insulating bushing, a shell of insulating material having a conductor extending therethrough, a hollow metallic terminal cap and means for securing it in position to close one end of said shell and enclose an end of said conductor, means insulating said end of said conductor from said cap, a test terminal extending through said cap and insulated therefrom, an electrical connection within said cap between said conductor and test terminal, and means outside said cap for releasably connecting said terminal and cap to maintain them at the same electrical potential during normal operation of the bushing.

3. In an insulating bushing, a shell of insulating material having a conductor extending therethrough, a hollow metallic terminal cap and means for securing it in position to close one end of said shell and enclose an end of said conductor, means insulating said end of said conductor from said cap, conducting means electrically connected to said conductor and extending through a wall of said terminal cap, means for insulating said conducting means from said wall, and a releasable connector device for electrically connecting said conducting means and cap.

4. In an insulating bushing, a shell of insulating material having a conductor extending therethrough, a hollow metallic terminal cap and means for securing it in position to close one end of said shell and enclose an end of said conductor, means insulating said end of said conductor from said cap, means upon which a test potential may be applied to said conductor including conducting means electrically connected to said conductor and extending through an opening in a wall of said terminal cap, means for insulating said conducting means from said wall, and a releasable connector device for electrically connecting said conducting means and cap after the test potential has been removed, said connector device being accessible from outside said cap.

5. In an insulating bushing, a cylindrical shell of dielectric material having a conductor extending axially therethrough, a cap for closing an end of said shell and having a terminal thereon, a member secured to said cap and depending from the inside thereof in alignment with said conductor, insulating means disposed between the confronting ends of said member and conductor and means on the confronting faces of said member, insulating means and conductor for interlocking them against relative rotation, said interlocking means being such that longitudinal movement of said conductor with respect to said member secured to the cap is permitted.

6. In an insulating bushing comprising a tubular stud of conducting material, a substantially cylindrical casing of dielectric material surrounding said stud, means for securing and sealing one end of said casing with respect to said stud, and a cap for closing the other end of the casing, the stud terminating within the cap, a removable cover for the cap, means carried by the cover for sealing the end of the stud against communication with the interior of the cap including means for electrically insulating the stud end from the cover, and resilient means reacting between said stud and the cap for clamping the latter in operative position including electrical insulation between the stud and cap to completely insulate the stud from the cap, a test terminal secured to the cap and insulated therefrom having an exposed portion to be connected to a test circuit, and means within the cap for electrically connecting the test terminal to said stud, a line terminal on said cover and an insulated conductor extending through said stud and connected to the cover within the cap.

7. In an insulating bushing, a cylindrical casing of insulating material having a mounting flange at one end thereof and a terminal cap at the other end, means including a hollow stud extending through said casing into said cap for clamping said flange, casing and cap in assembled relation, a conductor to be insulated by the bushing extending through said stud and electrically connected to said cap, means for insulating said stud from the cap, a test terminal on said cap and insulated therefrom having an exposed portion for connection to a test circuit, means within the cap for electrically connecting said terminal to said stud, and releasable means operable from outside the cap for bringing said terminal and cap to the same potential for normal operation of the bushing.

ALEXANDER A. SKVORTZOFF.
FRED J. VOGEL.